Aug. 28, 1928.

T. JOHNSTON

PACKING RING

Filed Jan. 7, 1926

1,682,130

THEODORE JOHNSTON
INVENTOR.

BY *E. G. Charles*

ATTORNEYS.

Patented Aug. 28, 1928.

1,682,130

UNITED STATES PATENT OFFICE.

THEODORE JOHNSTON, OF TOPEKA, KANSAS.

PACKING RING.

Application filed January 7, 1926. Serial No. 79,848.

My invention relates to packing rings, and has for its chief object the elimination of reciprocation with the piston.

A further object of my invention is to minimize the weight of the piston, thereby economizing the cost of the engine.

A still further object of my invention is to eliminate the necessity of regrinding the cylinders, the usual custom when the cylinders have become worn by packing ring friction.

A still further object of my invention is to provide a ring that the edges thereof will not become worn by the reciprocation of the piston as the ring is stationary and not acquiring momentum.

A still further object of my invention is to provide a ring having a greater width than is commonly used and centrally positioned with the stroke of the piston, that is to say, that the surface of the piston will be engaged the full length thereof by the ring in its reciprocation.

A still further object of my invention is to provide a ring that will tension on the walls of the piston while being stationarily housed in the walls of the cylinder.

A still further object of my invention is to provide a piston with a smooth uninterrupted periphery, and the wrist pin hole thereof having a stud locked in the piston closing the aperture to prevent pin scoring of the cylinder and to maintain a compression while passing the ring.

These and other objects will hereinafter be more fully explained.

Referring to the accompanying drawings in which.

Figure 1:
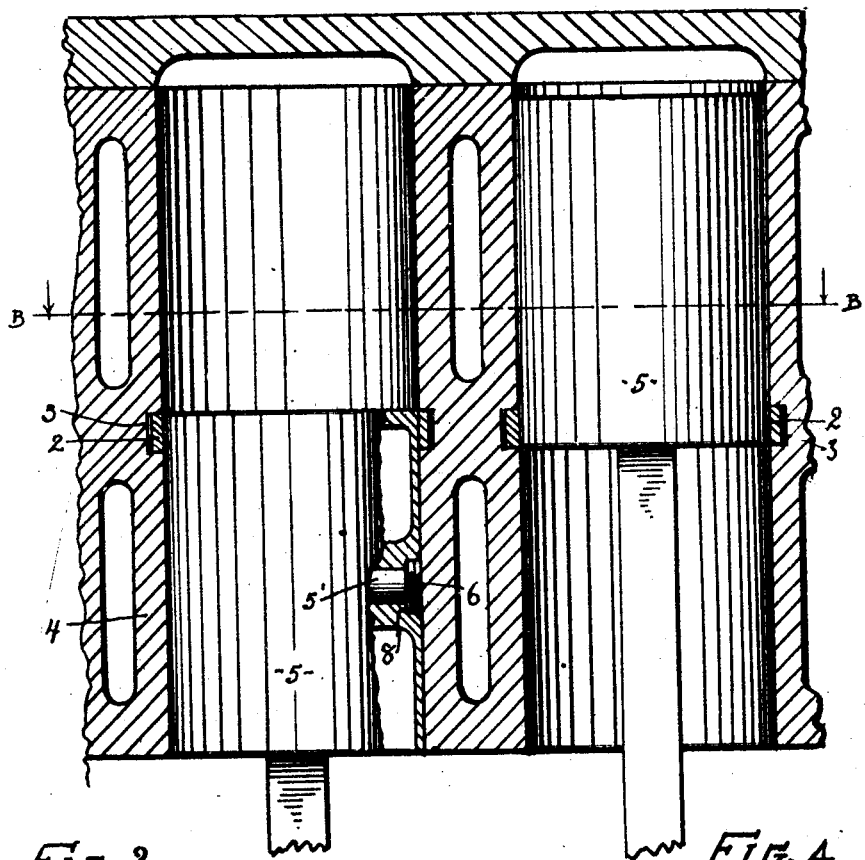
Fig. 1 is a sectional view through the cylinder, parts removed for convenience of illustration.
Figure 2:
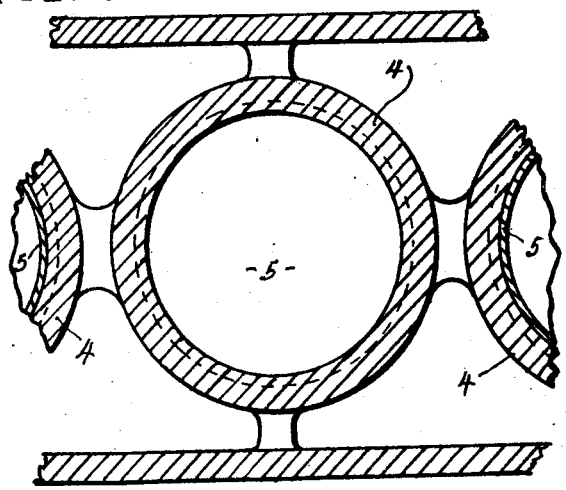
Fig. 2 is a cross section through the cylinder, taken on line B in Fig. 1.
Figure 4:
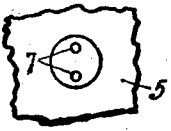
Fig. 4 is an end view of the stud and fragmentary part of the piston.
Figure 3:
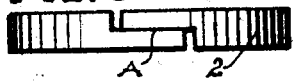
Fig. 3 is a side view of the cylinder ring showing the lap joint.

In Fig. 1, 2 is the ring housed in an annular channel 3, the said ring and channel are centrally positioned longitudinally in the walls of cylinder 4, 5 is the piston having uninterrupted exterior and adapted to engage with the ring in its reciprocation, the pistons being of such length that the ends will stop on its maximum stroke flush with the adjacent edge of the ring, the ring having tension and fitting snugly on the piston will acquire the usual compression. The piston has the usual connecting arm and wrist pin 5', the pin being made shorter to admit of a stud 6 threadedly engaging at the end thereof, the said stud being slightly convexed to conform to the diameter of the cylinder and having two apertures 7 diametrically positioned in the face thereof as means to receive spurs of a span wrench for the removal and placing of the stud, the said stud having a bearing on the shoulder as at 8 is binding means when driven up snugly functioning as a lock, other means of locking may be employed at the discretion of manufacturer.

The ring 2 is cut having a lap joint as at A, and the said ring is adapted to contract binding on the surface of the piston which is contrary to the ordinary piston ring, and the inside surface of the ring is smooth which is also contrary to the standard type of ring, and being of considerable width is means to engage a greater area of the piston and a greater tensioning strength is acquired by the excess width.

Such modifications may be employed as lies within the scope of the appended claim.

Having thus described my invention, what I claim as new and desire to secure by Letters Patent is:—

In a packing ring, the combination of a cylinder being uniform in diameter longitudinally, and a piston having an uninterrupted periphery to slidably engage in said cylinder, a ring stationarily positioned and engaging in an annular groove in the cylinder so that the ends of the piston will enter the ring in its reciprocations so that the wear imposed on the piston will be uniformly distributed its entire length, the ring functioning as sealing means for the peripheral engagement of the piston and cylinder.

THEODORE JOHNSTON.